US012580483B2

(12) United States Patent (10) Patent No.: US 12,580,483 B2
Warnes (45) Date of Patent: Mar. 17, 2026

(54) THREE OUTPUT DC VOLTAGE SUPPLY WITH SHORT CIRCUIT PROTECTION

(71) Applicant: Murata Manufacturing Co., Ltd., Nagaokakyo (JP)

(72) Inventor: Frank Warnes, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 334 days.

(21) Appl. No.: 18/210,820

(22) Filed: Jun. 16, 2023

(65) Prior Publication Data

US 2023/0327554 A1 Oct. 12, 2023

Related U.S. Application Data

(63) Continuation of application No. PCT/GB2021/053359, filed on Dec. 17, 2021.

(30) Foreign Application Priority Data

Dec. 18, 2020 (GB) ...................................... 2020189

(51) Int. Cl.
H02M 3/158 (2006.01)
H02J 7/00 (2006.01)
(Continued)

(52) U.S. Cl.
CPC ......... *H02M 3/158* (2013.01); *H02J 7/00304* (2020.01); *H02M 1/0009* (2021.05);
(Continued)

(58) Field of Classification Search
CPC ........ H02M 1/32; H02M 1/08; H02M 1/0009; H02M 1/325; H02M 3/06; G05F 1/613;
(Continued)

(56) References Cited

U.S. PATENT DOCUMENTS 4,740,878 A * 4/1988 Carter ..................... G05F 1/585
363/63
5,200,879 A 4/1993 Sasagawa et al.
(Continued)

FOREIGN PATENT DOCUMENTS

DE 2 000 993 A1 7/1971
DE 21 27 984 A1 9/1972
(Continued)

OTHER PUBLICATIONS

"Virtual Grounds: The art of rail splitting," John Broskie, https://web.archive.org/web/20180826184842/https://www.tubecad.com/2018/02/blog0412.htm, archived Aug. 26, 2018, URL: https://www.tubecad.com/2018/02/blog0412.htm (Year: 2018).*
(Continued)

*Primary Examiner* — Jue Zhang
*Assistant Examiner* — Jye-June Lee
(74) *Attorney, Agent, or Firm* — Keating & Bennett, LLP

(57) ABSTRACT

A power supply circuit for providing a positive, intermediate, and negative voltage supply includes positive and negative DC voltage buses that connect to a power source; a first voltage divider that is connected between the positive and the negative DC voltage buses, that includes a first transistor connected to the negative DC voltage bus, and that provides the intermediate voltage supply; a second voltage divider that is connected between the positive and the negative DC voltage buses and that is connected to the first transistor; and a short circuit protection module that includes a second transistor connected between outputs of the first and second voltage dividers and connected to the first transistor and that includes a current limiting element connected to the first transistor and configured to limit power dissipated by the first transistor in the case of a short circuit to the intermediate voltage supply.

18 Claims, 7 Drawing Sheets

(51) Int. Cl.
    *H02M 1/00*         (2006.01)
    *H02M 1/32*         (2007.01)
    *H02M 3/06*         (2006.01)

(52) U.S. Cl.
    CPC ............. *H02M 1/325* (2021.05); *H02M 3/06*
               (2013.01); *H02M 1/32* (2013.01)

(58) Field of Classification Search
    CPC .......... H03K 17/0826; H03K 17/0822; H03K
                    2217/0081; H02J 7/00304
    See application file for complete search history.

(56)           References Cited

U.S. PATENT DOCUMENTS

| | | | | |
|---|---|---|---|---|
| 6,069,950 A * | 5/2000 | Knollman | ........... | H04M 19/005 |
| | | | | 379/404 |
| 7,564,229 B2 * | 7/2009 | Odell | ................. | H02M 3/1588 |
| | | | | 307/41 |
| 7,759,914 B2 * | 7/2010 | Odell | .................... | H02M 3/158 |
| | | | | 323/225 |
| 9,806,593 B2 | 10/2017 | Nakayama et al. | | |
| 2002/0057583 A1 * | 5/2002 | Nishida | ............... | H02M 3/3385 |
| | | | | 363/21.07 |
| 2016/0301351 A1 | 10/2016 | Kaneda | | |
| 2020/0177087 A1 * | 6/2020 | Warnes | ................... | H02M 1/08 |

FOREIGN PATENT DOCUMENTS

| | | |
|---|---|---|
| DE | 26 56 466 A1 | 6/1977 |
| GB | 1 205 575 A | 9/1970 |
| GB | 2565297 A | 2/2019 |
| WO | 2014039191 A1 | 3/2014 |

OTHER PUBLICATIONS

Official Communication issued in International Patent Application No. PCT/GB2021/053359, mailed on Mar. 11, 2022.

* cited by examiner

THREE OUTPUT DC VOLTAGE SUPPLY WITH SHORT CIRCUIT PROTECTION

CROSS REFERENCE TO RELATED APPLICATIONS

This application claims priority to GB Patent Application No. 2020189.3 filed on Dec. 18, 2020 and is a Continuation Application of PCT Application No. PCT/GB2021/053359 filed on Dec. 17, 2021. The entire contents of each application are hereby incorporated by reference.

BACKGROUND OF THE INVENTION

1. Field of the Invention

The application relates to three output DC voltage supplies with short circuit protection and, in particular, to three output DC voltage supplies with short circuit protection for gate driving of transistors.

2. Description of the Related Art

Three output DC voltage supplies are used with components or circuits which require a positive, intermediate, and negative voltage supply.

One application of such a power supply is driving the gate of transistors, such as insulated gate bipolar transistors (IGBTs), Silicon Carbide (SiC), Gallium Nitride (GaN), and other metal oxide semiconductor field effect transistors (MOSFETs). Transistors such as these transistors require a specific positive and negative gate voltages to turn them on or off. In these cases, the power supply will provide a positive (+v), neutral (0V) and negative (−v) voltage supply, which is achieved by connecting the intermediate voltage supply to ground.

A known way to provide a three output DC power supply is described in related application GB 2565297, herein incorporated by reference in its entirety, whereby a pair of resistors set a base voltage of a transistor, which in turn provides a set voltage drop between an intermediate supply line and a negative supply line based on the base voltage.

However, if a short circuit occurs, for example between the 0V and positive output voltage supply lines, the power dissipated through the transistor can far exceed the operating limits of the device.

It is desirable to limit the power dissipated through components of a three output DC voltage supply in the case of a short circuit. In a first example, the power dissipated through the components is held at a safe level within the maximum capabilities of the components. In a second example, compatible with and developed from the first example, the power dissipated through the components is stopped at a safe level and subsequently reduced to limit damage to the components cause by long exposure to a constant short circuit.

SUMMARY OF THE INVENTION

A three output DC voltage supply with short circuit protection according to the preferred embodiments of the present invention provides a positive, intermediate, and negative voltage supply, as well as a positive DC voltage bus and a negative DC voltage bus that connect to a DC power source, a first voltage divider connected between the positive DC voltage bus and the negative DC voltage bus, wherein the first voltage divider includes a first transistor, and wherein an output of the first voltage divider provides the intermediate voltage supply, a second voltage divider connected between the positive DC voltage bus and the negative DC voltage bus, wherein an output of the second voltage divider is connected to the base of the first transistor, and a short circuit protection module, which includes a second transistor connected by the emitter and collector between the outputs of the first and second voltage dividers, and by the base to the emitter of the first transistor, and a current limiting element connected to the emitter of the first transistor and configured to limit the power dissipated by the first transistor.

The first and second transistors operate together with the current limiting element to limit the power dissipated through the first transistor in the event of a short circuit to the intermediate voltage supply. In particular, when a short circuit is detected, the first transistor needs to be turned off to protect the power supply circuit. The second transistor in conjunction with the current limiting element acts to drive the first transistor into cut-off as the load across the short circuit diminishes. This reduces the current through the first transistor, thereby limiting the power dissipated, and preventing damage to the circuit. Thus, the short circuit module of preferred embodiments of the present invention prevents damage to the three output power supply circuit.

The first transistor of the power supply according to the preferred embodiments of the present invention is connected by the collector to the negative DC voltage bus.

Either one or both of the first transistor and the second transistor of the power supply above can be PNP bipolar junction transistors (BJTs).

The first transistor of the power supply according to an alternative preferred embodiment of the present invention is connected by the collector to the positive DC voltage bus.

Either one or both of the first transistor and the second transistor of the power supply above can be NPN BJTs.

The current limiting element of the power supply circuit according to the preferred embodiments of the present invention can be a resistor which is connected between the emitter of the first transistor and the output of the first voltage divider.

A resistor provides a predictable linear current limiting function, which means that the operation of the circuit is independent of any type of voltage input or transient voltages from the circuit or the load.

The current limiting element of the power supply circuit according to preferred embodiments of the present invention further includes a third voltage divider connected between the negative DC voltage bus and the emitter of the first transistor, wherein the base of the second transistor is connected to an output of the third voltage divider.

A voltage divider supplying the base of the second transistor can allow the transistor to receive a high proportion of the voltage which is configured to feed the base, but also allows for the base voltage to be raised proportionally as the voltage configured to feed the base, i.e. the voltage drop across the emitter and the base, rises due to a fault. In conjunction with the first transistor this allows the emitter voltage of the first transistor to be raised exponentially in turn, leading to the first transistor limiting and reducing the current across it.

The current limiting element and third voltage divider according to preferred embodiments of the present invention are configured to reduce the power dissipated by the first transistor as a load connected between the positive voltage output and the intermediate voltage output approaches 0Ω. The current limiting element and the third voltage divider according to an alternative preferred embodiment of the present invention are configured to reduce the power dissipated by the first transistor as a load connected between the negative voltage output and the intermediate voltage output approaches 0Ω.

As the load causing the short circuit approaches 0Ω, the short circuit protection module reduces the current, in a trend such that the current reduces as the load reduces. This means that as the fault becomes more severe, potential damage to the circuit is less likely, such that an undetected fault left for an extended period of time does no more damage to the circuit than the initial fault. Furthermore, because the power loss is low there is less wasted power in the case of a fault.

The first voltage divider according to a preferred embodiment of the present invention includes a second resistor.

The second voltage divider according to a preferred embodiment of the present invention includes a third resistor and a fourth resistor.

The third voltage divider according to a preferred embodiment of the present invention includes a fifth resistor and a sixth resistor.

The power source according to a preferred embodiment of the present invention can be a rectified output from a transformer.

The three output DC voltage power supply is designed to connect to a DC power source; however, this does not have to be an absolute DC power source such as would be provided by a battery or the like, but can also be an approximate DC power source such as the output of a converter, i.e. the rectified output of a transformer.

The intermediate voltage supply of the three output DC voltage power supply may be a 0V voltage supply.

The above and other elements, features, steps, characteristics and advantages of the present invention will become more apparent from the following detailed description of the preferred embodiments with reference to the attached drawings.

BRIEF DESCRIPTION OF THE DRAWINGS

In the figures, like numbers are used to denote similar components throughout, with number prefixes based on the particular figure number.

DETAILED DESCRIPTION OF THE PREFERRED EMBODIMENTS

Figure 1:
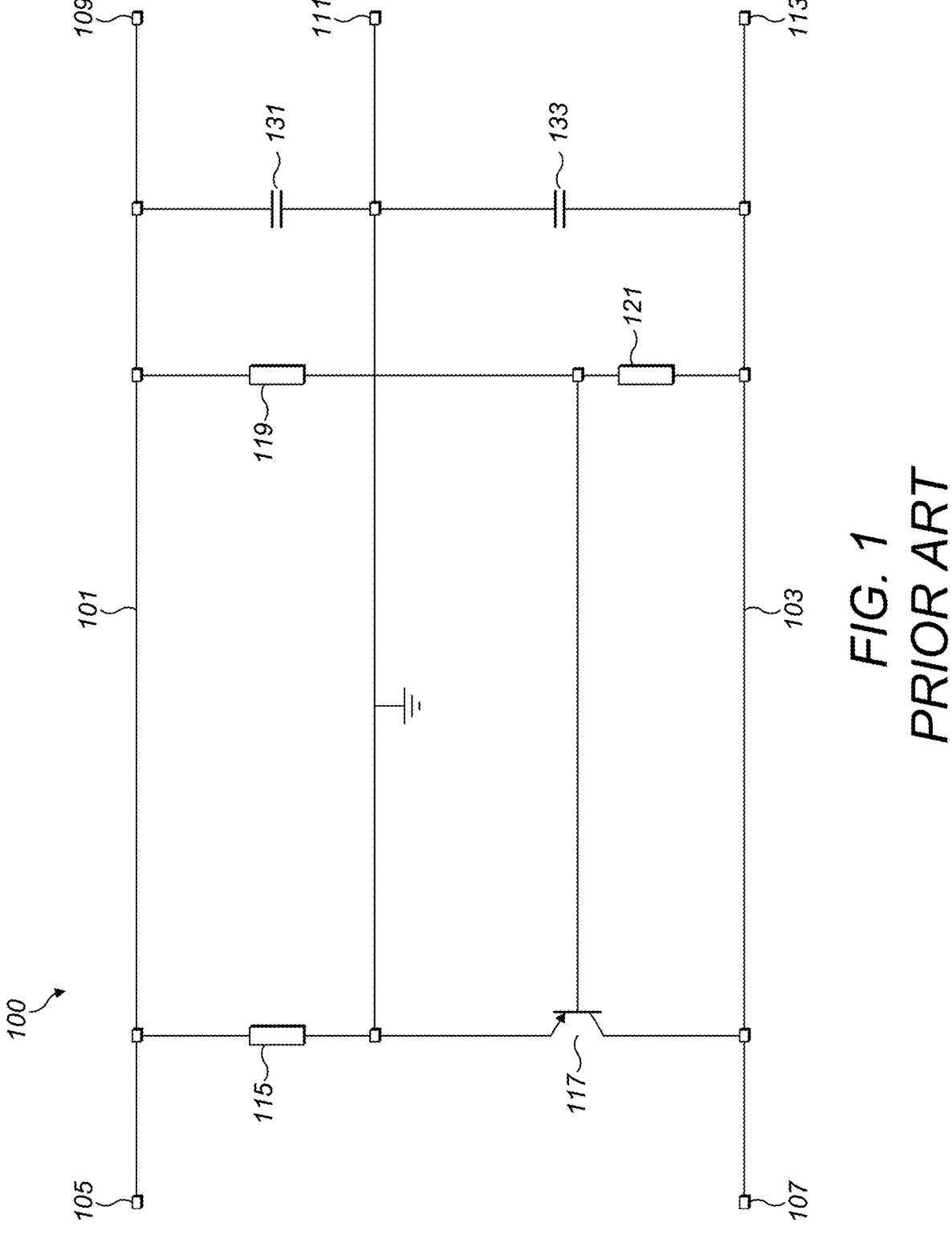
FIG. 1 is an example circuit diagram of a known three output DC voltage supply according.

A first example of a known three output DC voltage supply is shown in FIG. 1. This figure shows a three output DC voltage supply without any short circuit protection, and is helpful for understanding the circuits described and shown with respect to FIGS. 2, 4, 6 and 7.

FIG. 1 shows a three output DC voltage supply 100 including a positive DC voltage bus 101 and a negative DC voltage bus 103. The buses 101 and 103 include input terminals 105 and 107 respectively at their input ends, and output terminals 109 and 113 respectively at their output ends.

The positive voltage input terminal 105 and negative voltage input terminal 107 are typically connected to a DC power supply such as a battery, or a converter output, such that the positive DC voltage bus 101 is connected to a positive terminal of the DC voltage supply, and such that the negative DC voltage bus 103 is connected to a negative terminal of the DC voltage supply. It is to be noted that in this description the terminology "positive voltage" and "negative voltage" or the like are relative, such that the positive terminal of the DC voltage supply is positive with respect to the negative terminal of the DC voltage supply, and the negative terminal of the DC voltage supply is negative with respect to the positive terminal of the DC voltage supply.

DC power supplies include power supplies, outputs of DC-DC converters or AC-DC converters, batteries, and any supply which provides a substantially DC voltage supply.

The positive voltage output terminal 109 and negative voltage output terminal 113 form two of the three outputs of the three output DC voltage supply, where the terminal 109 provides a positive DC voltage output, and the terminal 113 provides a negative DC voltage output. The terminal 111 forms the third output of the three output DC voltage supply, and provides an intermediate voltage output. In this respect, the output of the negative voltage output terminal 113 is negative both with respect to the positive voltage output terminal 109 and the intermediate voltage output terminal 111. The positive voltage output terminal 109 is also positive with respect to both the negative voltage output terminal 113 and the intermediate output terminal 111.

FIG. 1 also provides a first voltage divider including a resistor 115 and a transistor 117, in this case a PNP transistor. The output of the first voltage divider is connected to ground, as well as to the 0V output terminal 111, and as such the output of the first voltage divider is 0 V. The transistor 117 therefore sets a reference voltage by which the negative DC voltage bus 103 is lower than 0 V and thus lower than the 0 V output terminal 111. For the purposes of this description, the output of a voltage divider is defined as the divided voltage which is supplied from the point where the components of the voltage divider meet.

Where it is not required that the intermediate output voltage is 0 V, the intermediate output voltage terminal 111 is not connected to ground.

This reference voltage is in turn set by a second voltage divider including resistors 119 and 121. The output of the second voltage divider is connected to the base of the transistor 117.

For the purposes of this description, the term resistor is used to mean a component which provides a resistance which can be specified or set by the user. It is noted that other components than a resistor can provide this function, such as a potentiometer, capacitor, coil, inductor, lamp, heating element etc.

The transistor 117 has an emitter-base voltage $V_{eb117}$ of a fixed amount, typically 0.6 V, but which can be somewhere in the range of $1 \times 10^{-1}$ V to 1 V. The voltage output of the second voltage divider $V_{vd2}$ is therefore configured, by setting the respective resistances of the resistors 119 and 121, to provide the required voltage difference $V_{-ve}$ between the intermediate voltage output terminal 111 and the negative voltage output terminal 113, minus the base emitter voltage drop of the transistor 117, as set out below $$V_{-ve} = 0V - V_{vd2} - V_{eb117}.$$

Thus, if the emitter-base voltage drop of transistor 117 is 0.6 V, as noted above, and the output of the second voltage divider is set as 4.4 V, the negative DC voltage bus 103 is set to −5 V.

For a supply voltage connected across the positive voltage input terminal 101 and the negative voltage input terminal 103 of 25 V, and according to the $V_{-ve}$ value calculated above, the three output terminals 109, 111, and 113, provide +20 V, 0 V and −5 V respectively, and can be used to drive the gate of a control transistor (not shown) connected across that terminals.

To achieve this, gate driver capacitors 131 and 133 are provided to ensure that the necessary current powering the control transistor (not shown) is available. If the circuit is used for a different application, the gate driver capacitors 131 and 133 may not be provided.

Figure 2:
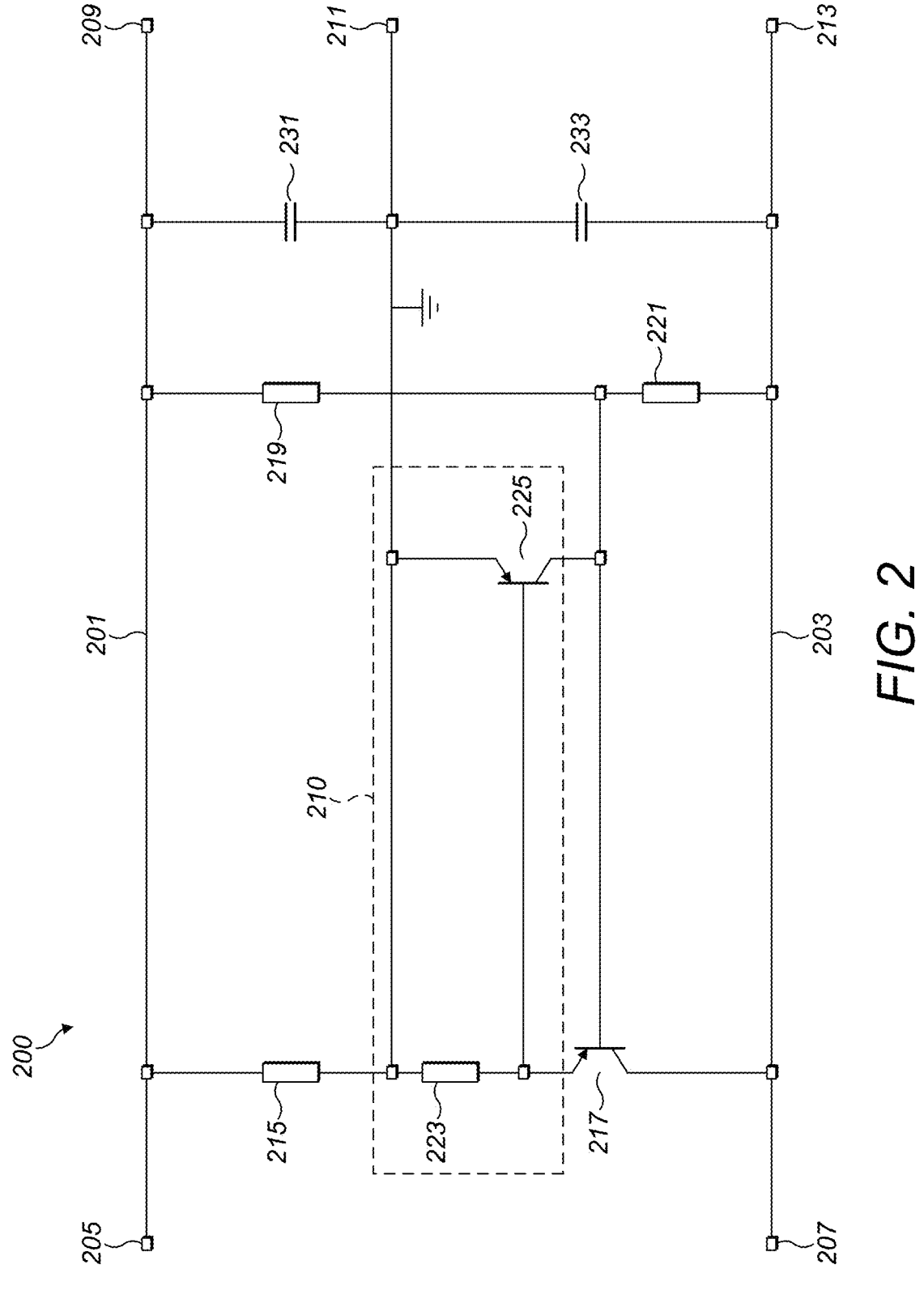
FIG. 2 is a circuit diagram of a three output DC voltage supply according to a first preferred embodiment of the present invention.
Figure 6:
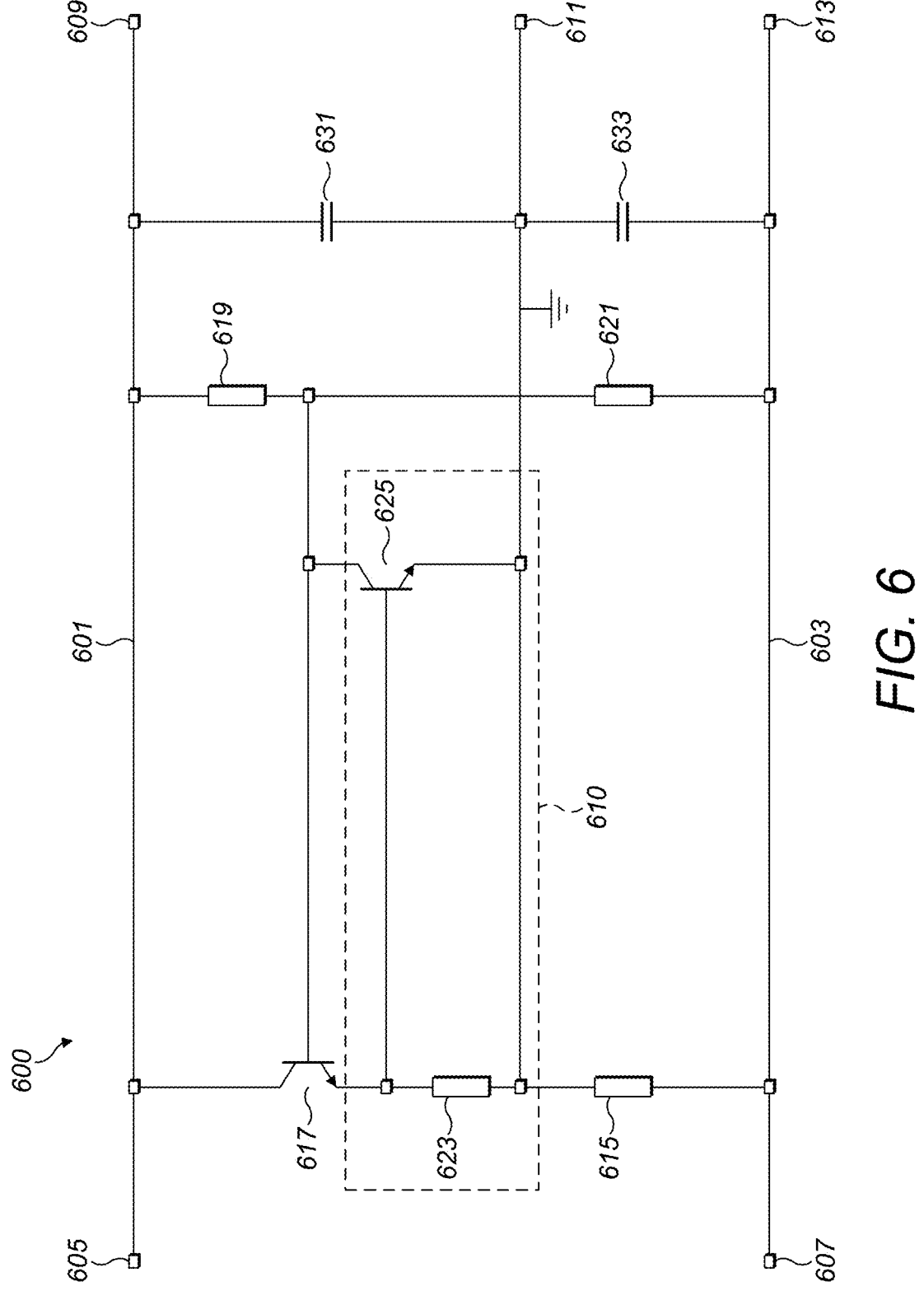
FIG. 6 is a circuit diagram of a three output DC voltage supply according to a third preferred embodiment of the present invention.
Figure 7:
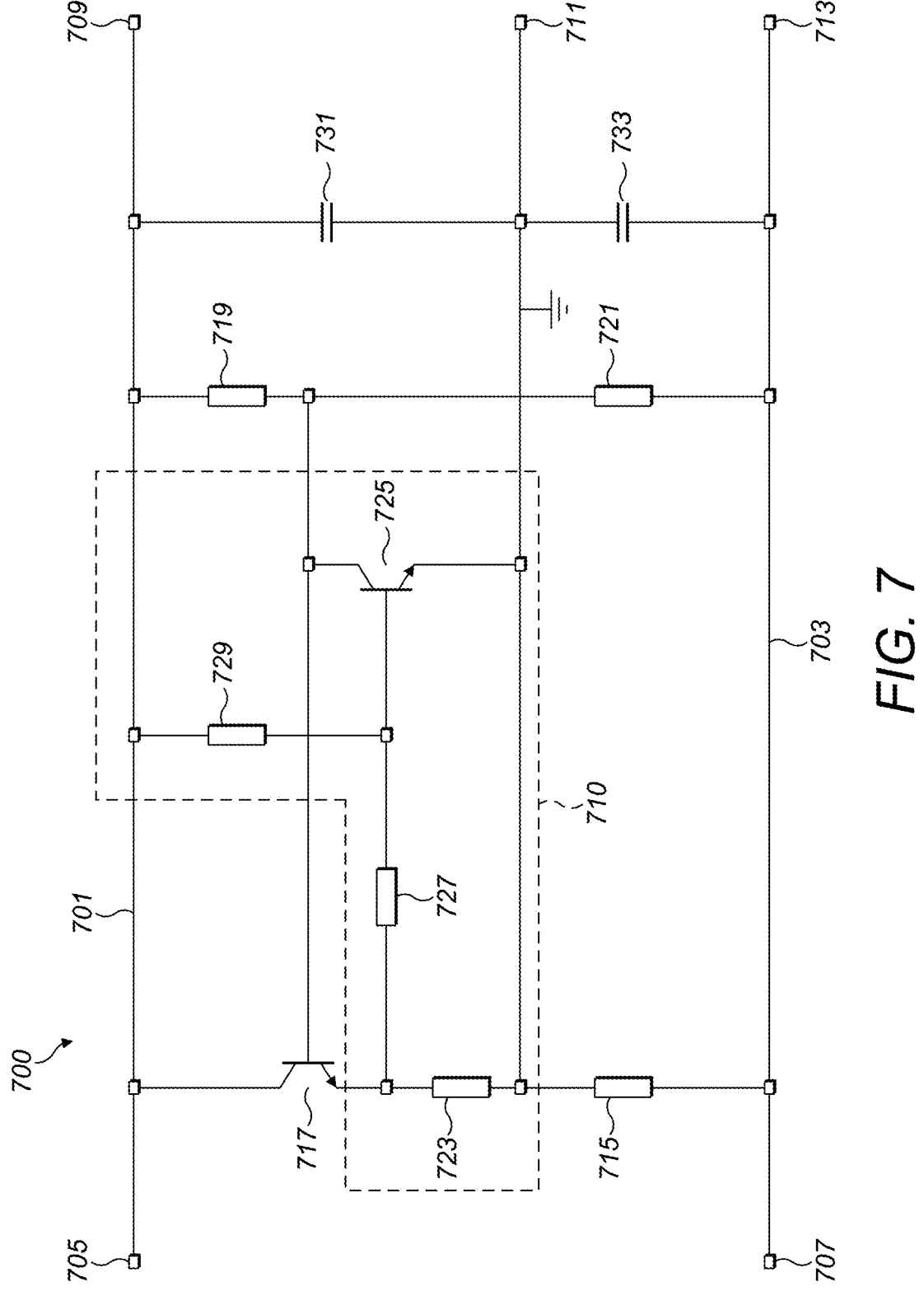
FIG. 7 is a circuit diagram of a three output DC voltage supply according to a fourth preferred embodiment of the present invention.

However, a problem can arise if a short circuit is applied across the positive voltage bus 101 and the intermediate terminal 111 because this will result in the full supply voltage connected across the positive voltage input terminal 105 and the negative voltage input terminal 107 being applied to the transistor 117. When this happens, for the above example, the power dissipated across the transistor 117 rises to a power in the range of tens of watts as the load across the positive voltage output terminal 109 and the 0V output terminal 111 approaches 0Ω. The example of FIG. 2 shows how to prevent such a high power from being dissipated across the transistor 117, and thus destroying the transistor 117 in such an event. As can be seen in the graph 301 of FIG. 3, the power $P_{217}$ through the transistor 217 reaches a maximum value when the load resistance is less than around 5Ω, which in some cases can be higher than the minimum rated power of the transistor 217 needed for the circuit to operate in the normal manner (without a short circuit). Further examples shown in FIGS. 6 and 7 provide protection if the load across the negative voltage output terminal 113 and the 0V output terminal approaches 0Ω.

The terms positive, intermediate, and negative are relative. All that is meant by these terms is that the positive voltage output terminal 109 provides a voltage which is positive with respect to voltages provided by both the intermediate voltage output terminal 111 and the negative voltage output terminal 113; the negative voltage output terminal 113 provides a voltage is negative with respect to voltages provided by both the intermediate voltage output terminal 111 and the positive voltage output terminal 109; and the intermediate voltage output terminal 111 provides a voltage which is negative with respect to the voltage provided by the positive voltage output terminal 109 and which is positive with respect to the voltage provided by the negative voltage output terminal 113.

Where it is desired to provide an intermediate voltage which is 0 V, the intermediate voltage output terminal 111 is connected to ground.

FIG. 2 shows a three output DC voltage supply 200 according to a first preferred embodiment of the present invention, and in particular shows the three output DC voltage supply according to FIG. 1 with the addition of a short circuit protection module 210 shown in dotted lines.

The DC voltage supply circuit 200 of FIG. 2 is a circuit where the voltage setting transistor 217 is connected between the negative voltage output terminal 213 and the intermediate output terminal 211.

The circuit of FIG. 2 operates in the same manner as the circuit of FIG. 1 when there is no short circuit. The circuit of FIG. 2 includes positive and negative DC voltage buses 201 and 203 respectively, each including connected positive and negative voltage input terminals 205 and 207 and positive and negative voltage output terminals 209 and 213. An intermediate voltage output terminal 211 is provided connected to both ground and the output of a first voltage divider. Where it is not required that the intermediate output voltage is 0 V, the intermediate output voltage terminal 111 is not connected to ground.

The first voltage divider, as in FIG. 1, includes a transistor 217 and a resistor 215, and the base of the transistor 217, as in FIG. 1, is driven by the output of a second voltage divider including resistors 219 and 221.

Gate driver capacitors 231 and 233 are as well provided, to ensure that the necessary current for powering the control transistor (not shown) is available. If the circuit is used for a different application, the gate driver capacitors 231 and 233 may not be provided.

In addition to FIG. 1 the circuit of FIG. 2 includes a short circuit protection module 210.

The short circuit protection module provides a resistor 223 in series with the transistor 217, and a further transistor 225 which is connected between the output of the second voltage divider including resistors 219 and 221 and the output of the first voltage divider including resistor 215 and transistor 217, connected to the intermediate voltage output terminal.

It is noted that the resistor 223 is a portion of the first voltage divider, because it is connected in series with the voltage drop setting transistor 217. The effect of the resistor 223 is negligible, however, because the resistor 223 is selected to be a very low value resistor, in the range of tens of ohms. In conjunction, the value of the resistor 215 is comparably large, so as to drop the voltage not dropped across the transistor 217. The value of the resistor 215 is in the range of $1 \times 10^4 \Omega$, or tens of kilo-ohms. Thus, the current through the first voltage divider is kept very low, and the voltage drop across the resistor 223 is also very low. In this scenario, the voltage dropped across the resistor 223 is in the range of $1 \times 10^{-2}$ V, or tens of millivolts.

In normal operation therefore, the voltage drop across the resistor 223 can be ignored for practical purposes. As will be discussed later, during a short circuit, the value of the resistor 223 is selected so that the short circuit protection module 200 is operated while the current through the resistor 223 is within the maximum current capability of the transistor 217.

Therefore, in normal operation, the operation of the circuit of FIG. 2 is the same as the operation of the circuit of FIG. 1.

However, when a short circuit is applied to the three output DC voltage supply 200, particularly across the positive output voltage terminal 209 and the intermediate voltage output terminal 211, the short circuit protection module 210 operates to limit the current, through the transistor 217, thus protecting the transistor 217.

For the purpose of the description, the term "short circuit" is used to define a trend where the resistance or impedance of the load connected to the three output DC voltage supply approaches 0Ω.

As a short circuit develops, i.e., as the load connected to the three output DC voltage supply approaches 0Ω, the current through the resistor 223 rises. The current rises until the voltage drop across the resistor 223 reaches a voltage equivalent to the emitter-base voltage of the transistor 225. Once this has occurred, transistor 225 is saturated and connects the base of the transistor 217 to the intermediate voltage output terminal. Turning on the transistor 225, as this is known, operates the short circuit protection module 200.

As noted above, the value of the resistor 223 is selected so that the maximum current through the transistor 217 is within the maximum current capability of the transistor 217. This value can therefore be calculated once the emitter-base voltage of the transistor 225 is known. As an example, if the emitter-base voltage of the transistor 225 is 0.6 V, and the maximum current capability of the transistor 217 is around 60 mA, then the value of resistor 223 can be set at 12Ω, such that when the maximum voltage difference of 0.6 V is applied across the emitter and the base of the transistor 225, thereby forcing the transistor 225 into saturation, the current through the transistor 217 (and the resistor 223) is 50 mA. It can be understood that, the smaller the value of the resistor 223 is, the less voltage is dropped across it in the normal operation of the circuit, but the smaller the value of the resistor 223 is, the higher the current allowed by the resistor 223 in a short circuit.

The operation of the short circuit protection module 210 by turning on the transistor 225 is as follows.

As explained above, the base of the transistor 217 is connected to the output of the second voltage divider including resistors 219 and 221, and the transistor 225 is connected between this output of the second voltage divider and to the intermediate voltage output terminal 211. Because the condition in which the short circuit protection module is activated is when the load across the positive output voltage terminal 209 and the intermediate output terminal 211 is reducing, the effect can be likened to the gradual connection of the positive voltage output terminal to the output of the second voltage divider, through the transistor 225, and this increases the current flowing through the resistor 221.

This action increases the voltage applied to the base of the transistor 217, and due to the voltage drop created by the resistor 223 (because of the short circuit) the emitter-base voltage of the transistor 217 is reduced below its saturation voltage, and the transistor 217 enters cut-off.

This stops the action of the three output DC voltage supply in a state where the increased fault current through the transistor 217 is at a manageable level.

The action of the short circuit protection module 210 has been described using terms relating to semiconductors such as cut-off and saturation to better explain the interaction of the elements of the circuit. However, the action of the transistors 217 and 225 are in essence interacting in a linear state of negative feedback.

As the current rises through the resistor 223, the transistor 225 transitions from cut-off towards saturation, and begins to allow current to flow through the resistor 221. This in turn rises to a point where the transistor 217 begins to transition from saturation to cut-off. Furthermore, the voltage drop caused by the resistor 223 acts in a linear negative feedback manner to this by transitioning from a $1 \times 10^{-2}$ V volt drop to the voltage equivalent to the emitter base voltage of the transistor 225, which in turn raises the current through the transistor 225 and into the resistor 221, into the base of the transistor 217, and so on to hold the current at a constant level defined by the size of the resistor 223, and the emitter-base voltage of the transistor 225, whereby the voltage across the resistor 223 can only increase up to a point where the transistor 225 moves into saturation, thus limiting the current through the resistor 223 and transistor 217.

The transistors 217 and 225 used are PNP BJTs. These can be replaced with P type FETs.

Figure 3:
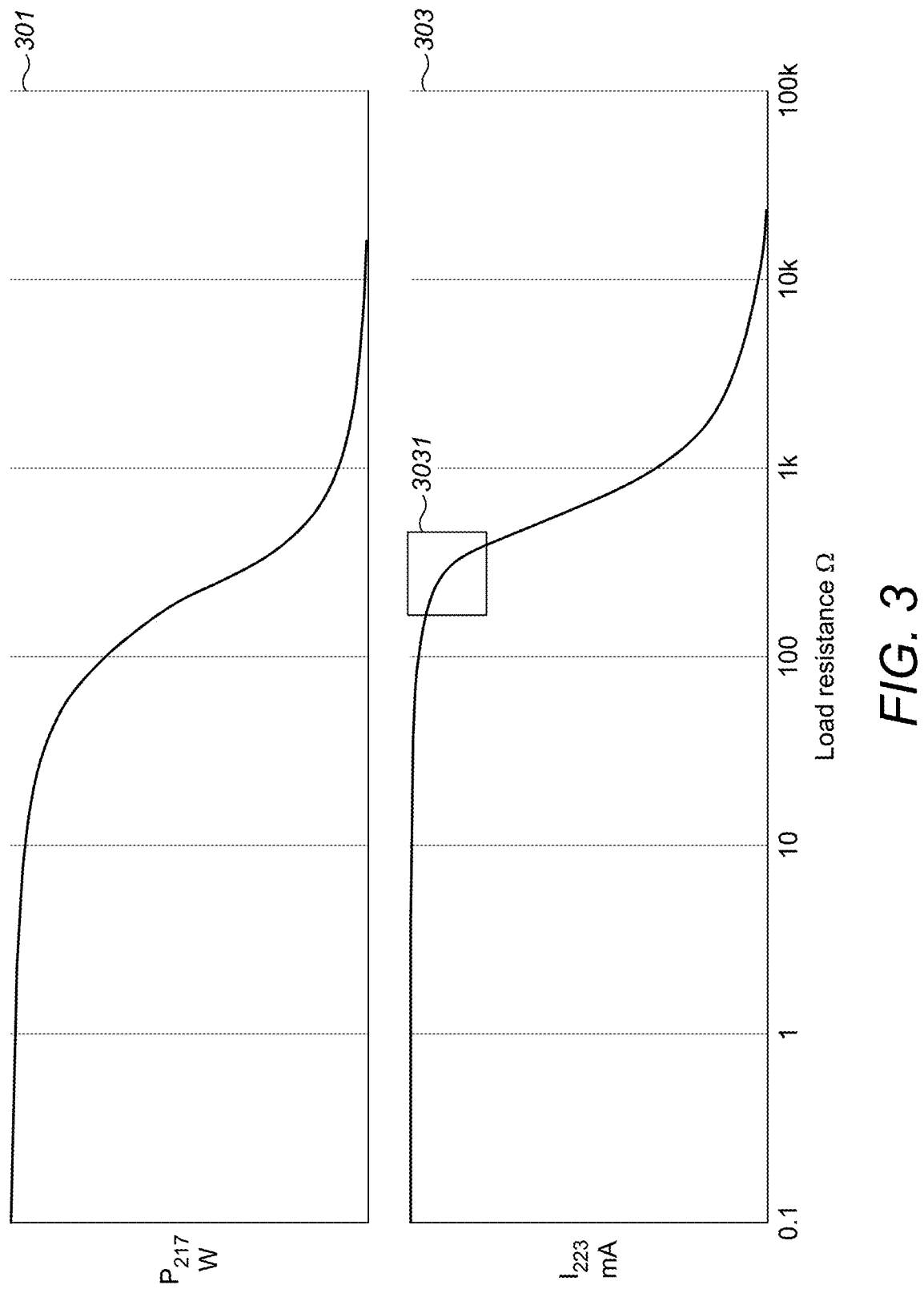
FIG. 3 shows an example representation of power dissipation through the voltage setting transistor and current dissipation through the first voltage divider of FIG. 2.

The action of the short circuit protection module 210 to limit the current through the transistor 217 as the load across the positive voltage output terminal 209 and the intermediate voltage output terminal 211 approaches 0Ω is best shown in FIG. 3.

FIG. 3 shows a first graph 301 plotting the power dissipated through the transistor 217, and a second graph 303 plotting the current through the resistor 223 (and in turn through the transistor 217), as the load across the positive voltage output terminal 209 and the 0 v output terminal 211 approaches 0Ω.

In both graphs 301 and 303 the load across the positive voltage output terminal 209 and the intermediate voltage output terminal 211 is shown on a logarithmic scale in ohms (Ω).

In the first graph 301, it can be seen that power dissipation by the transistor 217 begins to rise significantly as the load drops below the order of $1 \times 10^3 \Omega$ or one kilo-ohm. This power dissipation then rises up to a point where the action of the short circuit protection module 200 begins to slow the rise, then as the load falls below the order of tens of ohms, the power dissipated is held at a steady level by the complete negative feedback interaction of transistors 217 and 225.

This negative feedback point is more clearly visible in the second graph 303 which shows a very clear "knee" 3031 where the current through the resistor 223 has reached a point such that the voltage drop across the resistor 223 is equivalent to the base voltage of the transistor 225. This means that the transistor 225 represents roughly a short circuit, or very low resistance circuit between the intermediate voltage output terminal 211 and the top of the resistor 221, and in turn the base of the transistor 217.

It can be seen by comparing the two graphs 301, 303 that once the current "knee" 3031 has been reached in graph 303, although the current itself is at almost a maximum, at the same load resistance the power shown in graph 301 is only half way to its peak. This means that while the current across the resistor 223 has risen to a maximum at a load resistance across the positive voltage output terminal 209 and the intermediate voltage output terminal in the order of $1 \times 10^2 \Omega$, or hundreds of ohms, the power dissipated by the transistor 217 continues to rise until the resistance of the load is in the order of tens of ohms.

Figure 4:
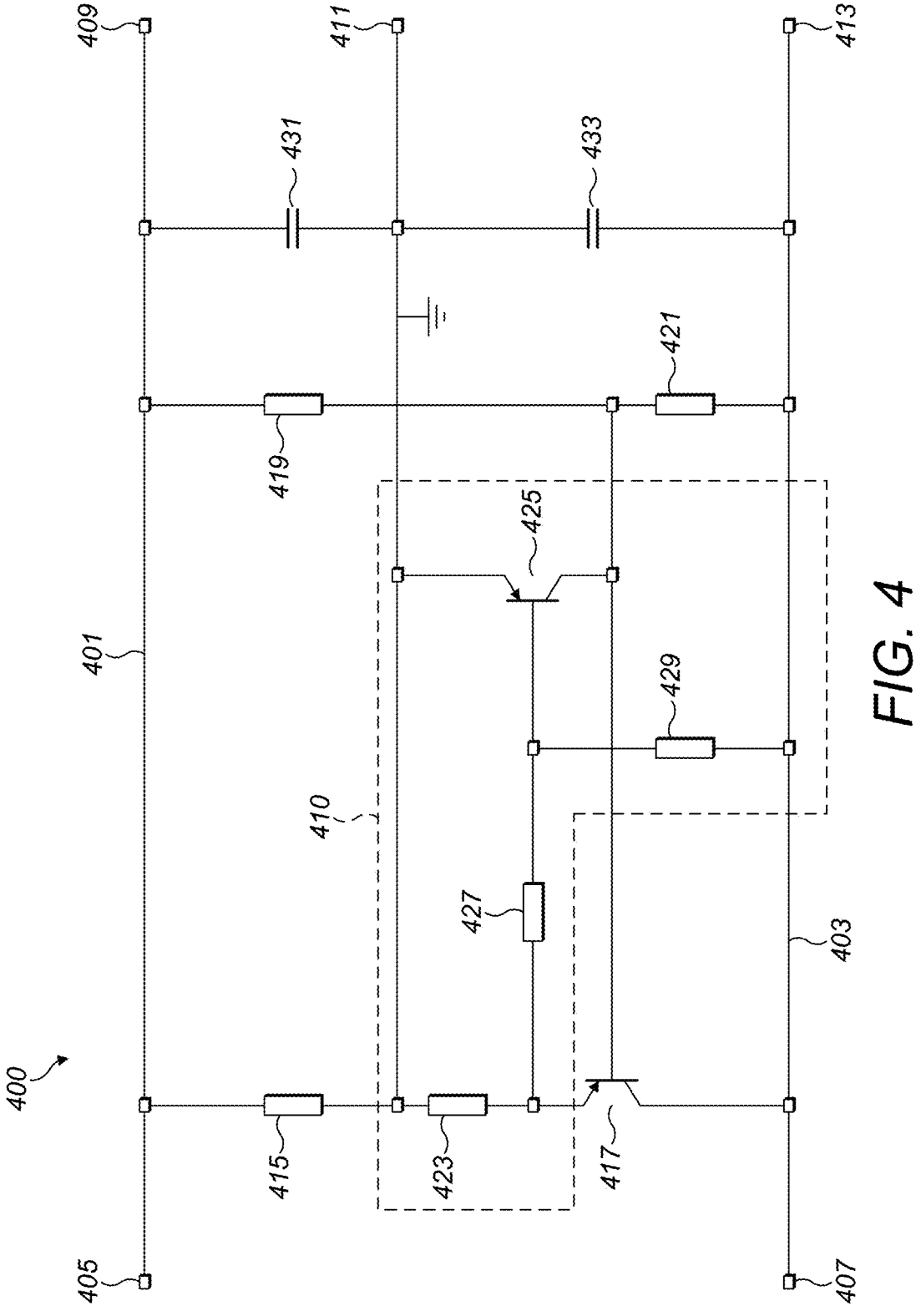
FIG. 4 is a circuit diagram of a three output DC voltage supply according to a second preferred embodiment of the present invention.

FIG. 4 shows a three output DC voltage supply 400 according to a second preferred embodiment of the present invention, and in particular shows the three output DC voltage supply according to FIG. 1 with the addition of a short circuit protection module 410 shown in dotted lines.

The DC voltage supply circuit 400 of FIG. 4 includes a voltage setting transistor 417 connected between the negative voltage output terminal 413 and the intermediate output terminal 411.

The circuit of FIG. 4 operates in the same manner as the circuit of FIG. 1 when there is no short circuit. The circuit of FIG. 4 includes positive and negative DC voltage buses 401 and 403 respectively, each including connected positive and negative voltage input terminals 405 and 407 and positive and negative voltage output terminals 409 and 413. An intermediate voltage output terminal 411 is provided connected to both ground and the output of a first voltage divider. Where it is not required that the intermediate output voltage is 0 V, the intermediate output voltage terminal 111 is not connected to ground. The first voltage divider, as in FIG. 1, includes a transistor 417 and a resistor 415, and the base of the transistor 417, as in FIG. 1, is driven by the output of a second voltage divider including resistors 419 and 421.

Gate driver capacitors 431 and 433 are as well provided, to ensure that the necessary current for powering the control transistor (not shown) is available. If the circuit is used for a different application, the gate driver capacitors 431 and 433 may not be provided.

In addition to FIG. 1 the circuit of FIG. 4 includes a short circuit protection module 410, the operation of which differs in some respects from that of the short circuit protection module 210 of FIG. 2.

As in FIG. 2, a resistor 423 is provided in series with the transistor 417, and a transistor 425 is connected across the output of the second voltage divider including the resistors 419 and 421 and the output of the first voltage divider including the resistor 415 and the transistor 417.

However, in addition to the short circuit protection module 210 of FIG. 2, the base of the transistor 425 of the short circuit module 410 is connected to the output of a third voltage divider, including resistors 427 and 429, which is in turn connected across the emitter of the transistor 417 and the negative DC voltage bus 403.

This means that the voltage supplied to the emitter-base of the transistor 425, rather than being the voltage dropped over resistor 423, compared to resistor 223 in the short circuit protection module 210 of FIG. 2, is instead the voltage dropped over resistor 427 as well as that dropped over 423. This defines the output voltage of the third voltage divider including resistor 427 and 429.

The values of the resistors 427 and 429 are arranged such that under normal conditions, the voltage applied to transistor 425 is approximately half of the maximum emitter-base voltage required to drive transistor 425 into saturation. This value could be any proportion of the maximum-base emitter voltage, other than half.

The short circuit protection module 410 takes advantage of the fact that the transistor 425 acts as a sensor, which begins to saturate when the emitter base voltage of the transistor 425 is equal to its set emitter base voltage.

In the same way that the second voltage divider including resistors 419 and 421 sets a voltage drop across the transistor 417 to be the output of the second voltage divider plus the emitter-base voltage of the transistor 417, as described with respect to FIG. 1, the third voltage divider including resistors 427 and 429 sets the voltage drop across the transistor 425 to be the output of the third voltage divider plus the base voltage of the transistor 425.

During the short circuit between the positive voltage output terminal 2019 and the intermediate voltage output terminal 211, as the resistance load of the three output voltage divider 400 approaches 0Ω, the voltage through the transistor 417 increases. Voltage through the resistor 423, and the third voltage divider therefore also increases, and this increase is presented partly across the emitter-base of transistor 425, which acts as sensor sensitive to its emitter-base voltage. This means that the voltage across resistors 423 and 427 cannot exceed the set emitter-base voltage of the transistor 425, which in the above example was 0.6 V, because otherwise the transistor 425 is saturated and bypasses the resistors 423 and 427, and begins to allow current to flow through the resistor 421.

The voltage continues to increase as the load approaches 0Ω, where the voltages dropped respectively across the resistor 423 and 427 increase unequally until approximately half of the emitter-base voltage of transistor 425 is dropped across the resistor 427, with the remainder dropped across the resistor 423.

At this point, the voltage dropped across the resistor 423 begins to drop off again as resistor 427 takes more and more of the exemplary 0.6 V. This limits the current through the resistor 423, and therefore through the transistor 417, and as more of the emitter-base voltage of transistor 425 is dropped across the resistor 427, and thus less is dropped across the resistor 423, the current through the resistor 423 and transistor 417 decreases further from its maximum limit as the load tends towards 0Ω.

As the transistor 425 begins to turn on, the voltage is again increased to the base of the transistor 417, thus pushing the transistor 417 towards cut-off.

Naturally, the value of the resistor 423 can be halved with respect to the resistor 223, as only half of the transistor saturation voltage is required to be dropped across it before the short circuit protection module 410 is operated due to the combined resistances of the resistors 423, 427, and 429. This further means that in normal operation there is even less voltage drop and current across the resistor 423.

The transistors 417 and 425 used are PNP BJTs. These can be replaced with P type FETs.

Figure 5:
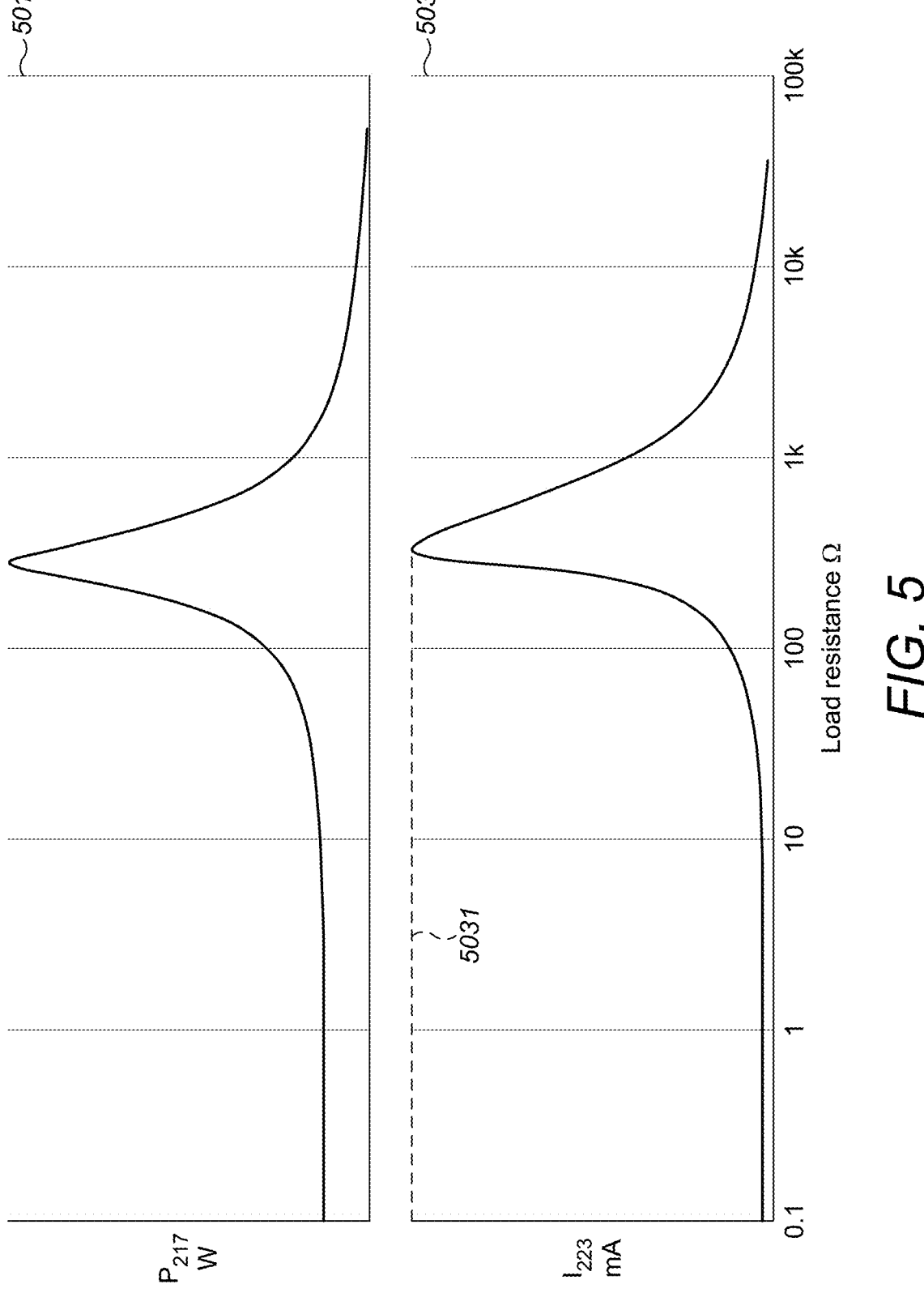
FIG. 5 shows an example representation of power dissipation through the voltage setting transistor and current dissipation through the first voltage divider of FIG. 4.

The action of the short circuit protection module 410 to limit the current through the transistor 417 as the load across the positive voltage output terminal 409 and the intermediate voltage output terminal 411 approaches 0Ω is best shown in FIG. 5.

FIG. 5 shows a first graph 501 plotting the power dissipated through the transistor 417, and a second graph 503 plotting the current across the resistor 423 (and in turn across the transistor 417), as the load across the positive voltage output terminal 409 and the intermediate voltage output terminal 411 approaches 0Ω.

In both graphs 501 and 503, the load across the positive voltage output terminal 409 and the intermediate voltage output terminal 411 is shown on a logarithmic scale in ohms (Ω).

In the first graph 501, it can be seen that power dissipation by the transistor 417 again begins to rise significantly as the load drops below the order of $1 \times 10^3 \Omega$ or one kilo-ohm. This is because, in normal operation, the circuit of FIG. 4 works in the same manner as the circuit of FIG. 2. The power dissipation by the transistor 417 rises up similarly to the graph 301 in FIG. 3, but to a lower point, where the action of the short circuit protection module prevents the power from rising any further. This is where the action of the third voltage divider including the resistors 427 and 429 raises the voltage applied at the base of the transistor 425, pushing it towards saturation. This in turn reduces the share of the transistor 425 emitter-base voltage across the resistor 423, thereby reducing the current through the transistor 417 and thus the power dissipated by the transistor 417 reduces further and further as the load across the positive voltage output terminal 409 and the intermediate voltage output terminal 411 approaches 0Ω, and the voltage in the resistor 427 rises.

It can be seen in the second graph 503 that the current through the resistor tracks the power through the transistor as described above. It should be noted that the cut-off current, shown by line 5031, is at roughly the same current as in the graph of 303, despite the lower value of the resistor 423 compared to the resistor 223 of FIG. 2.

Because after this point the current and power is then reduced through the transistor 417, the maximum power dissipated by the transistor 417 is reduced in comparison to the circuit of FIG. 2. As was noted with respect to the graphs 301 and 303 of FIG. 3, the power dissipated through the transistor 217 continues to rise after the current has reached its peak, and as such at peak current through the resistor 223 the power dissipated by the transistor 217 has not peaked, and is at roughly half peak power. In graph 501, the short circuit protection module 410 operates at roughly the peak current, which corresponds, similarly to FIG. 3, to approximately half peak power in graph 503, and this power then does not rise to a peak value, but reduces in line with the current.

Furthermore, it can be seen that even after this peak power is reached, as the load across the positive voltage output terminal 409 and the intermediate voltage output terminal 411 lowers further towards 0Ω, the power dissipated through the transistor 417 is reduced from the peak, thus minimizing the damage to the components of the circuit, and reducing power loss, further than the short circuit module 210 of FIG. 2.

FIG. 6 shows an alternative version of the circuit of FIG. 1 with a short circuit protection module which operates in accordance with the short circuit protection module of FIG. 2.

The circuit 600 of FIG. 6 includes a voltage setting transistor 617 connected between the positive voltage output terminal 609 and the intermediate output terminal 611. The base of the transistor 617 is driven by the output of a second voltage divider including resistors 619 and 621.

With respect to the DC voltage supply circuit 200 of FIG. 2, the first voltage divider of the circuit 600 is inverted so that the transistor 617 is connected by its collector to the positive DC voltage bus 601. The resistor 615 is connected to the negative DC voltage bus 603. The resistor 623 of the short circuit protection module 610 is connected between the resistor 615 and the transistor 617 as in the circuit of the DC voltage supply 200 of FIG. 2. The positive and negative DC voltage buses 601 and 603 respectively, each include connected positive and negative voltage input terminals 605 and 607 and positive and negative voltage output terminals 609 and 613.

Gate driver capacitors 631 and 633 are as well provided, to ensure that the necessary current for powering the control transistor (not shown) is available. If the circuit is used for a different application, the gate driver capacitors 631 and 633 may not be provided.

Operation of the circuit is the same as the circuit DC voltage supply 200 of FIG. 2; however, the circuit is configured to protect the transistor 617 in the event of a short circuit across the negative voltage output terminal 613 and the intermediate voltage output terminal 611.

To provide the inverted protection of the circuit 600 with respect to the DC voltage supply circuit 200 of FIG. 2, the transistors 617 and 625 are NPN BJTs. These can be replaced with N type FETs.

FIG. 7 shows an alternative version of the circuit of FIG. 1 with a short circuit protection module which operates in accordance with the short circuit protection module of FIG. 4.

The circuit 700 of FIG. 7 includes a voltage setting transistor 717 connected between the positive voltage output terminal 709 and the intermediate output terminal 711. The base of the transistor 717 is driven by the output of a second voltage divider including resistors 719 and 721.

With respect to the DC voltage supply circuit 400 of FIG. 4, the first voltage divider of the circuit 700 is inverted so that the transistor 717 is connected by its collector to the positive DC voltage bus 701. The resistor 715 is connected to the negative DC voltage bus 703. The resistor 723 is connected between the transistor 715 and the resistor 717 as in the circuit 700 of FIG. 2.

The base of the transistor 725 of the short circuit protection module 710 is connected to the output of a third voltage divider, including resistors 727 and 729, which is in turn connected across the emitter of the transistor 717 and the positive DC voltage bus 701.

Gate driver capacitors 731 and 733 are as well provided, to ensure that the necessary current for powering the control transistor (not shown) is available. If the circuit is used for a different application, the gate driver capacitors 731 and 733 may not be provided.

Operation of the circuit is the same as the circuit 400 of FIG. 4; however, the circuit is configured to protect the transistor 717 in the event of a short circuit across the negative voltage output terminal 713 and the intermediate voltage output terminal 711.

To provide the inverted protection of the circuit 700 with respect to the circuit 400 of FIG. 4, the transistors 717 and 725 used are NPN BJTs. These can be replaced with N type FETs.

Throughout the figures the intermediate voltage output terminal is shown connected to ground. The intermediate voltage output terminal is connected to ground when it is required that the intermediate voltage output is 0 V, which, as described above, is not always the case. When it is not required that the intermediate voltage output is 0 V, the terminal will not be connected to ground, and the ground connection shown on the figures will therefore be omitted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three output DC voltage supply with short circuit protection for providing a positive, intermediate, and negative voltage supply, comprising:

a positive DC voltage bus and a negative DC voltage bus that connect to a DC power source;

a first voltage divider connected between the positive DC voltage bus and the negative DC voltage bus, wherein the first voltage divider comprises a first transistor, and wherein an output of the first voltage divider provides the intermediate voltage supply;

a second voltage divider connected between the positive DC voltage bus and the negative DC voltage bus, wherein an output of the second voltage divider is connected to a base of the first transistor, and;

a short circuit protection module including;

a second transistor including an emitter, a collector, and a base, wherein the emitter and the collector are connected between the outputs of the first and second voltage dividers, and the base is connected to an emitter of the first transistor, and;

a current limiting element connected to the emitter of the first transistor and configured to limit power dissipated by the first transistor in case of a short circuit to the intermediate voltage supply.

2. The three output DC voltage power supply of claim 1, wherein the first transistor includes a collector, the collector of the first transistor is connected to the negative DC voltage bus.

3. The three output DC voltage power supply of claim 2, wherein the first transistor includes a PNP bipolar junction transistor.

4. The three output DC voltage power supply of claim 2, wherein the second transistor includes a PNP bipolar junction transistor.

5. The three output DC voltage power supply of claim 2, wherein the current limiting element includes a resistor connected between the emitter of the first transistor and the output of the first voltage divider.

6. The three output DC voltage power supply of claim 1, wherein the first transistor includes a collector, the collector of the first transistor is connected to the positive DC voltage bus.

7. The three output DC voltage power supply of claim 6, wherein the first transistor includes an NPN bipolar junction transistor.

8. The three output DC voltage power supply of claim 6, wherein the second transistor includes an NPN bipolar junction transistor.

9. The three output DC voltage power supply of claim 1, wherein the current limiting element includes a resistor connected between the emitter of the first transistor and the output of the first voltage divider.

10. The three output DC voltage power supply of claim 9, wherein the current limiting element further includes a third voltage divider connected between the negative DC voltage bus and the emitter of the first transistor, wherein the base of the second transistor is connected to an output of the third voltage divider.

11. The three output DC voltage power supply of claim 10, wherein the current limiting element and the third voltage divider are configured to reduce the power dissipated by the first transistor as a load connected between the positive voltage supply and the intermediate voltage supply approaches 0 Q.

12. The three output DC voltage power supply of claim 10, wherein the third voltage divider includes a fifth resistor and a sixth resistor.

13. The three output DC voltage power supply of claim 9, wherein the current limiting element further includes a third voltage divider connected between the positive DC voltage bus and the emitter of the first transistor, wherein the base of the second transistor is connected to an output of the third voltage divider.

14. The three output DC voltage power supply of claim 13, wherein the current limiting element and the third voltage divider are configured to reduce the power dissipated by the first transistor as a load connected between the negative voltage supply and the intermediate voltage supply approaches 0 $\Omega$.

15. The three output DC voltage power supply of claim 1, wherein the first voltage divider includes a second resistor.

16. The three output DC voltage power supply of claim 1, wherein the second voltage divider includes a third resistor and a fourth resistor.

17. The three output DC voltage power supply of claim 1, wherein the DC power source is a rectified output from a transformer.

18. The three output DC voltage power supply of claim 1, wherein the intermediate voltage supply is a 0V voltage supply.

* * * * *